Patented Nov. 20, 1945

2,389,477

UNITED STATES PATENT OFFICE 2,389,477

POLYSILOXANE RESINS

James G. E. Wright, Alplaus, and James Marsden, Schenectady, N. Y., assignors to General Electric Company, a corporation of New York No Drawing. Application August 21, 1942, Serial No. 455,615

19 Claims. (Cl. 260—2)

The present invention relates to polysiloxane resins of improved aging and curing characteristics and to a method of preparing such resins from the intermediate condensation products obtained by hydrolyzing one or more organo-silicon halides including mixtures of organo-silicon halides and a silicon tetrahalide.

Heat-hardenable organo-polysiloxane resins, sometimes called silicone resins, are ordinarily prepared by hydrolyzing compositions comprising organo-silicon halides having the general formula $R_aSiX_{4-a}$ wherein R represents a hydrocarbon radical, specifically an alkyl, aryl, aralkyl or alkaryl radical, X represents a halogen atom, specifically a chlorine or bromine atom, and $a$ is a whole number and is at least 1 and not more than 2, or preferably by hydrolyzing mixtures of such organosilicon halides and a silicon tetrahalide such as silicon tetrachloride or silicon tetrabromide. The hydroxy compounds formed by hydrolysis of the halides readily condense so that the immediate products of hydrolysis are resinous intermediate condensation products of a very complicated molecular structure. As these liquid or soluble intermediate hydrocarbon-substituted polysiloxanes may be further condensed or polymerized to a solid state, they are used as such or in solution in a suitable solvent as coating and impregnating compositions. The heat-hardened products are in general characterized by good heat resistance as compared with ordinary organic resins. For example, a methyl polysiloxane resin may be heated for several days at 200° C. without discoloration. However, when heated to 300° C. in air, it disintegrates within 24 hours. Generally the first sign of disintegration is a localized cracking or crazing of the film. On continued heating, the cracks become more numerous until finally the whole film is cracked or crazed.

The present invention is based on our discovery that by treating the above-mentioned intermediate condensation products, particularly the heat-hardenable intermediates containing an average of at least one and less than two organo (alkyl and aryl) groups per silicon atom, in solution in a substantially inert solvent at elevated temperatures with catalysts comprising a hydrated salt (to be described more fully hereinafter), novel liquid resinous products may be obtained having characteristics not possessed by the untreated resins. Cured, i. e., heat-hardened, films of the organo-polysiloxanes prepared in accordance with our invention are outstanding in their heat- and age-resistance. Marked improvements in the flexibility of heat-hardened films of the products have also been noted. Furthermore, films of our treated intermediate polysiloxanes may be cured to a tack-free state faster and at a lower temperature than the untreated resins. Certain of the liquid products may be heated for long periods of time without gelling.

The reactions which take place when the intermediate products are treated in accordance with our invention are probably rather complex since the treated products differ markedly in their properties from the untreated materials. Since some water is formed during the treating process, the treatment has been called a "precondensation" treatment and the products "pre-condensed silicones" or, more specifically, "pre-condensed polysiloxane resins." However, reactions other than condensation reactions must also be involved since it does not seem possible that the properties possessed by the products of our invention are due solely to a moderate increase in the molecular weight of the intermediate polysiloxanes during treatment. In all probability, the pre-condensation treatment also includes an opening up of ring compounds and a subsequent "re-condensation" thereof to form different condensation products, cured films of which are outstanding in their age- and heat-resistance.

Intermediate polysiloxane condensation products prepared by any known method can be treated in accordance with our invention. We prefer to use any of the heat-hardenable intermediate products prepared by adding a solution of the silicon halides in an inert solvent to a mixture of water and a higher aliphatic alcohol, as described and claimed in application of Robert O. Sauer, Serial No. 455,617, or those prepared by adding a solution of the silicon halides in an unsymmetrical methyl ketone to water as described in the application of James Marsden, Serial No. 455,616, both of which applications were filed concurrently herewith and assigned to the same assignee as the present invention. The solutions of the intermediate condensation products obtained by any of the known methods of hydrolysis are washed substantially free of acid and, in most cases, concentrated to a substantially solvent-free state before being dissolved in a suitable solvent and subjected to the pre-condensation treatment.

The class of solvents found to be suitable for use in carrying of our pre-condensation treatment includes carbon tetrachloride and the aromatic hydrocarbons such as toluene, benzene, and xylene. In certain instances, the presence of other specific organic liquids such as the higher ketones, e. g., methylisobutyl ketone, methyl amyl ketone, as well as certain alcohols, such as tertiary amyl alcohol, can be tolerated.

A hydrated salt, such as hydrated ferric chloride, appears to be an essential component of any catalyst or catalyst combination capable of effectively pre-condensing the intermediate resins in accordance with our invention. Although a definite improvement is obtained by the use of hydrated salt, such as hydrated ferric chloride, as the sole catalyst, we prefer to use a combination of catalysts including a hydrated salt and a condensing agent such as antimony pentachloride. Other catalyst combinations include hydrated salts such as hydrated ferric or ferrous chlorides, hydrated stannic chloride and hydrated copper sulphate, and condensing agents such as anhydrous ferric chloride, aluminum chloride, or antimony trichloride. Alternatively, the intermediate polysiloxane resins may be treated with one of the metal salts, i. e., with either the hydrated salt or the condensing agent, and thereafter treated with the other salt.

In order that those skilled in the art better may understand how our invention is carried into effect the following specific examples are given:

*Example 1.*—The liquid intermediate polysiloxane used in this example was a methyl polysiloxane obtained by adding a toluene solution of a mixture 21.5 mol per cent silicon tetrachloride, 9 mol per cent methyltrichlorosilane, and 69.5 mol per cent dimethyldichlorosilane to a mixture of butanol, toluene, and water in accordance with the process described and claimed in the above-mentioned copending application of Robert O. Sauer. About 900 parts by weight of the intermediate condensation product was dissolved in 900 parts toluene and this solution added to a solution of 45 parts antimony pentachloride and 27 parts hydrated ferric chloride in 900 parts toluene. The resultant solution was heated at refluxing temperatures for 2 hours. The temperature of the liquid during the refluxing period was about 100 to 102° C. The length of time the resin solution is refluxed does not appear to be particularly important. At least no differences have been observed in pre-condensed resins obtained by refluxing for 2 hours and those obtained by refluxing for 5 hours. Three liters of water were added to the refluxed product and the resultant mixture stirred for approximately 10 minutes. After the aqueous medium had separated from the varnish due to difference in density, the lower aqueous layer was drawn off. Washing of the varnish layer was continued until the pH of the final wash water was between 4 and 6. The remaining water and the insoluble solids, which probably consisted of antimony pentoxide and ferric hydroxide, were removed from the varnish after the final wash by centrifuging. The varnish was concentrated to the desired viscosity by distilling off the required amount of solvent.

The heat resistance of the pre-condensed resin was determined by impregnating a woven glass tape 3 mils thick with the resin solution and heating the impregnated tape in air at elevated temperatures. The pre-condensed resin of this example, crazed only after 30 days heating at 275° C., whereas the original methyl polysiloxane resin, prior to pre-condensation, crazed after being heated for only 15 minutes at the same temperature.

The pre-condensed resin-impregnated tape had an average dielectric strength of 1000 volts per mil at room temperature and was ideally suited for use as electrical insulation. On aging, the dielectric strength of the impregnated tape which had a thickness of from 7 to 8 mils did not change appreciably until fine cracks appeared in the resin. Measurements of dielectric strength taken over these cracks gave a value of approximately 200 volts per mil. When 50 per cent or more of the measurements taken at random points on the tape were 200 volts per mil or less, the tape was assumed to be generally crazed from a dielectric standpoint.

Carbon tetrachloride, and aromatic hydrocarbon solvents such as benzene or xylene, may be substituted for the toluene used in the above example. No significant differences in the properties of the pre-condensed resin have resulted from such substitution. Preferably, the solvent such as toluene used in carrying out the pre-condensation reaction is one that has been recovered from a previous batch since the resins thereby obtained are even more craze-resistant than those obtained by pre-condensing a polysiloxane resin in the ordinary technical grades of toluene. Possibly the improvement results from the fact that some impurities in the technical toluene are removed during the pre-condensation treatment. Similar improved results may be obtained if the technical grades of toluene are first purified by treatment with concentrated sulphuric acid.

*Example 2.*—A methyl polysiloxane resin prepared by the hydrolysis of a mixture 59.4 mol per cent dimethylchlorosilane, 22.8 mol per cent methylchlorosilane, and 17.8 mol per cent silicon tetrachloride by the hydrolysis process referred to in Example 1 was dissolved in sufficient xylene to form a solution containing 28.6 per cent resin base. After addition of 5 per cent by weight of antimony pentachloride and 3 per cent by weight of hydrated ferric chloride based on the weight of the resin, the solution was refluxed for ½ hour at a temperature of 120° C. The crazing time of the product as determined by aging glass tapes coated and impregnated therewith in air at 300° C. was 50 hours. Similar results were obtained using benzene in place of xylene.

The methyl polysiloxane resinous products of our invention have been found to cure more rapidly to the "sticky stage" than do the ordinary methyl polysiloxane resins. In addition, larger quantities of the pre-condensed resins are retained on the glass fiber sheets during the curing process.

*Example 3.*—Example 1 was repeated using a catalyst consisting of 3 per cent hydrated ferric chloride based on the weight of the resin in place of the mixture of antimony pentachloride and hydrated ferric chloride. The crazing time of the product when heated at 300° C. was 16 hours. This product can be made more craze-resistant by further treatment with antimony pentachloride. Similarly, the useful life of the resin prepared by the use of a catalyst consisting of antimony pentachloride can be increased by further treatment with hydrated ferric chloride. In other words, a resin with similar crazing characteristics may be prepared either by using a combination of catalysts in a 1-step process or by using single catalysts in a 2-step process even though in the 2-step process the first catalyst is washed out of the resin before the resin is treated with the second catalyst.

*Example 4.*—A 33.3 per cent toluene solution of the methyl polysiloxane intermediate of Example 1 was treated with a catalyst mixture consisting by weight of 1.6 per cent ferric chloride and 3 per cent hydrated ferric chloride based on the weight of the resin. After refluxing for 2 hours the product was washed and separated from the iron salts and water and made into a varnish. Cured films of this resin on glass tapes could be heated for as long as 60 hours at 300° C. before crazing set in.

By substituting a catalyst consisting of 5 per cent antimony pentachloride and 3.3 per cent hydrated ferrous chloride for the ferric chloride-hydrated ferric chloride catalyst combination of Example 4, a resinous material was obtained which could be heated for 40 hours at 300° C. before crazing.

*Example 5.*—A methyl-phenyl polysiloxane resin was prepared by adding a toluene solution of a mixture of 20.5 g. silicon tetrachloride, 102.0 g. phenyltrichlorosilane and 77.5 g. dimethyldichlorosilane to a mixture of water, tertiary amyl alcohol, and toluene. The final product was a 40 per cent solution of a polysiloxane resin in a mixture of toluene and amyl alcohol. One hundred grams of this 40 per cent solution was diluted with 60 g. toluene and 2 g. antimony pentachloride and 1.2 g. hydrated ferric chloride were added thereto. The resultant mixture was heated for two hours at reflux temperatures. The liquid resinous product was washed with water, separated from the water and metal salts, and concentrated by evaporation of the solvent to the desired viscosity. Films of the product on glass tape withstood a temperature of 300° C. for 57 hours before crazing. Films heated at 275° C. crazed only after being heated for 456 hours.

*Example 6.*—A 30 per cent solution of an ethyl-phenyl polysiloxane resin in toluene was refluxed for 2 hours with a catalyst consisting of 5 per cent by weight of antimony pentachloride and 3 per cent by weight of hydrated ferric chloride based on the weight of the resin. Glass fiber tapes were impregnated with the original resin and also with the pre-condensed resin. Films of the untreated resin crazed after being heated for only 3 hours at 275° C. while films of the pre-condensed resin could be heated to the same temperature for 33 hours before crazing set in.

Heating of a mass of the pre-condensed ethyl-phenyl polysiloxane for 3 hours at 200° C. caused the mass to gel throughout. When the original ethyl-phenyl polysiloxane was heated to this temperature the only change noted was the "skinning-over" of the liquid resin after 24 hours heating. Except for this formation of a solid skin, the original resin was still liquid after being heated for a total of 48 hours at 200° C. and 75 hours at 275° C.

*Example 7.*—A mixture of chlorosilanes consisting of 59.4 mol per cent dimethyldichlorosilane, 22.8 mol per cent methyltrichlorosilane, and 17.8 mol per cent silicon tetrachloride was hydrolyzed by slowly adding a solution of 400 g. of the mixed silanes in 400 g. methyl isobutyl ketone to 1150 g. water cooled in an ice bath. The water was drawn off and the methyl isobutyl ketone solution diluted to a resin base content of 25 per cent by the addition of the required amount of toluene. The resin solution was refluxed for two hours with 5 per cent antimony pentachloride and 3 per cent hydrated ferric chloride. The crazing time of the resulting product when heated to 300° C. was 20 hours. The untreated resin crazed in less than one-half hour at this temperature.

The degree of improvement in the craze resistance of the final product for any particular resin appears to depend on the concentrations of the resin and the catalyst in the treating solution during pre-condensation. If the concentrations of the resin or the catalyst are too high, the resin may gel during treatment. The results obtained by varying the concentration of a methyl polysiloxane resin in toluene solution while holding the concentration of the catalyst constant at 5 per cent antimony pentachloride and 3 per cent hydrated ferric chloride based on the weight of the resin are set forth in the following table:

*Table 1*

| Per cent resin base in toluene solution | Gel time at 200° C. | Crazing time at 300° C. |
|---|---|---|
|  | *Hours* | *Hours* |
| 33.3 | (¹) | (¹) |
| 28.6 | 0.5 | 60 |
| 25.0 | 26 | 45 |
| 20.0 | 66 | 45 |
| 10.0 | 420 | 1 |
| (Methyl polysiloxane resin before pre-condensation) | 6 | 0¼ |

¹ Gelled during refluxing.

The methyl polysiloxane resin was prepared by adding a toluene solution of a mixture of 20 mol per cent silicon tetrachloride, 55 mol per cent dimethyldichlorosilane, and 25 mol per cent methyltrichlorosilane to a mixture of toluene, n-butanol, and water. The gel time and crazing time of the original methyl polysiloxane resin used in these experiments are included for comparison with the pre-condensed resin. Each of the pre-condensation solutions was refluxed for 2 hours. It will be noted that when the concentration of the resin is less than about 20 per cent during treatment, the resulting product is not so craze-resistant, but can be heated for longer periods of time without gelling. On the other hand, if the concentration is as high as 33.3 per cent the resin gels during treatment. For most applications, particularly electrical applications, we prefer those resins having a crazing time of at least about 10 hours at 300° C. The curing time, that is, the time necessary to cure the resin to a tack-free state on the glass fiber base, also increases as the concentration of the treating solution of the resin is decreased.

The craze resistance of the product obtained by carrying out the pre-condensation in a 10 per cent solution may be increased to 20 hours by doubling the concentration of the catalyst. Similarly, if the concentration of the catalyst used in treating the 20 per cent resin solution is halved, the craze resistance of the final product will decrease to 1 hour at 300° C.

With regard to the cure properties of the pre-condensed resins, the concentration of the resin in the solution during pre-condensation has a marked effect, whereas the concentration of the catalyst causes little or no change in the curing time. The minimum concentration of resin and catalyst necessary to produce a satisfactory craze-resistant product, as well as the maximum possible concentrations thereof which can be used without gelation of the resin during treatment depends also on the composition of the original methyl polysiloxane resin, as is shown by the following table:

Table 2

| Composition | per cent resin base | Per cent SbCl₃¹ | Per cent FeCl₃.6H₂O¹ | Crazing Time at 300° C. |
|---|---|---|---|---|
| | | | | Hours |
| B | 20 | 5.0 | 3.0 | 7 |
| C | 20 | 5.0 | 3.0 | 45 |

¹ Based on the weight of resin.

Resin B was prepared by hydrolyzing a mixture of 16 per cent silicon tetrachloride, 58 per cent dimethyldichlorosilane, and 26 per cent methyltrichlorosilane. Resin C was the same resin used in Table 1. A product which crazes only after 46 hours may be obtained from composition B by pre-condensing at a resin base content of 33 per cent.

In general, it may be said that in order to obtain maximum craze resistance for any particular resin, pre-condensation should be carried out in a solution containing the maximum concentrations of resin and catalyst which do not result in gellation of the resin during the refluxing procedure although, as has been shown, improved products can be obtained when the concentration of the resin is as low as 10 per cent, particularly when the catalyst content of the solution is correspondingly increased. Ordinarily we use from 3 to 15 per cent by weight of the catalyst or catalyst combination based on the weight of the resin. The optimum catalyst concentration depends on the concentration of the resin and on the particular properties desired in the final resin.

Many of the pre-condensed methyl polysiloxane resins also differ from the untreated resins in exhibiting a "thermoplastic" behavior. The thermoplasticity depends in general on the composition of the halides from which these resins are made and on the concentration of the resins in solution during pre-condensation. The pre-condensed resin made from composition C (Table 2) is one example of a thermoplastic resin. When this resin is applied to a glass tape and cured for a short time at a relatively low temperature of about 125 to 150° C., the film becomes non-sticky and very flexible. Additional heating of the coated tape at 300° C. for 15 minutes results in a further curing of the resin to a point where the coated tapes are flexible at high temperatures but rather brittle at room temperature. For example, the resin film cracks at room temperature when the coated tape is wound on a rod having a diameter of 200 mils. However, further heating of the cracked tape causes the cracks to heal due to a further flowing of the resin until the resin ultimately loses its thermoplasticity but at the same time becomes more flexible even at room temperature. After being heated for 3 hours at 300° C. the resin no longer flows and the impregnated tape may be wound on a rod of 60 mil diameter at room temperature without cracking. The thermoplastic behavior of these resins when coated on glass tape is advantageous from a technical viewpoint in that the product prior to final hardening is a pressure-sensitive, or pressure- and heat-sensitive, adhesive tape. For example, in the taping of armature coils, one may use a glass tape impregnated with a resin which has been cured to the thermoplastic stage. After winding the impregnated tape around the armature coils, the whole assembly may be heated in order to cure the resin to the non-thermoplastic stage. During this final curing process the layers of impregnated tape bond together giving a rigid structure.

The resinous materials of our invention may be used in any of the various applications in which organo-polysiloxane resins have previously been used. For example, they may be used as conductor insulation, as binders, and heat-resistant insulation for electrical coils, in the manufacture of so-called semi-conducting paints, as impregnating and coating compositions for sheet materials, or for many other applications such, for example, as those mentioned in Patents 2,258,218–222, issued to Eugene G. Rochow. Of the various pre-condensed methyl polysiloxane resins prepared in accordance with our invention, the pre-condensed methyl polysiloxane resins prepared from the products of hydrolysis of mixtures of halogenosilanes consisting essentially of from about 52 to 80 mol per cent dimethyldichlorosilane, 8 to 28 mol per cent methyltrichlorosilane, and 12 to 25 mol per cent silicon tetrachloride (or similar mixtures of other halogenosilanes such as the bromosilane derivatives), are preferred for most applications. The resins so obtained cure rapidly when films thereof are heated at an elevated temperature and the cured products are characterized by a combination of desirable properties including toughness, good electrical properties, good abrasion-resistance, and exceptional heat-resistance.

What we claim as new and desire to secure by Letters Patent of the United States, is:

1. The method treating a polysiloxane resin to obtain a product of improved craze-resistance which comprises dissolving a soluble hydrocarbon-substituted polysiloxane resin containing an average of at least one and not more than two hydrocarbon radicals per silicon atom in an inert solvent selected from the class consisting of carbon tetrachloride and the lower aromatic hydrocarbons to form a solution having a resin content of from 10 to 33 per cent by weight and heating said solution to reflux temperatures in contact with a catalyst comprising a hydrated metal salt selected from the class consisting of hydrated ferric chloride, ferrous chloride, stannic chloride and copper sulphate.

2. The method of treating hydrocarbon-subustituted polysiloxane resins wherein the average number of hydrocarbon groups per silicon atom is not more than two while said resins are in the intermediate liquid stage of resinification to obtain products of improved craze-resistance which comprises dissolving the intermediate resins in an inert solvent selected from the class consisting of the lower aromatic hydrocarbons to form a solution having a resin content of from 10 to 33 per cent by weight and heating said solution at reflux temperatures in contact with a catalyst comprising a hydrated metal salt selected from the class consisting of hydrated ferric chloride, ferrous chloride, stannic chloride and copper sulphate.

3. The method which comprises dissolving a heat-hardenable methyl polysiloxane resin containing an average of not more than two methyl radicals per silicon atom in a lower aromatic hydrocarbon solvent to form a solution having a resin base content of from 10 to 33 per cent by weight and refluxing said solution with a catalyst comprising a hydrated salt selected from the class consisting of hydrated ferric chloride, ferrous chloride, stannic chloride and copper sulphate.

4. The method which comprises dissolving a liquid hydrocarbon-substituted polysiloxane resin wherein the average number of hydrocarbon groups per silicon atom is not more than two in an inert solvent selected from the class consisting of carbon tetrachloride and lower aromatic hydrocarbons, adding to said solution a mixture of metal halide salts comprising hydrated ferric chloride and heating the resultant composition at reflux temperatures for at least about two hours, the concentrations of the resin in said solution being such that the resin comprises from 10 to 33 per cent by weight of the solution.

5. The method which comprises forming a solution of an hydrocarbon-substituted polysiloxane resin containing an average of not more than two hydrocarbon radicals per silicon atom in an aromatic hydrocarbon solvent to form a solution of said resin containing from 10 to 33 per cent by weight of resin, and heating at reflux temperatures said solution in contact with a catalyst comprising a minor proportion of hydrated ferric chloride and a major proportion of antimony pentachloride for from about 2 to 5 hours, the total amount of catalyst being less than that which would cause gellation of the resin during the heating period.

6. The method which comprises dissolving a heat-hardenable liquid ethyl-phenyl polysiloxane resin containing an average of not more than two hydrocarbon radicals per silicon atom in a lower aromatic hydrocarbon solvent to form a solution containing from 10 to 33 per cent by weight of resin and heating said resin solution at refluxing temperatures in contact with a catalyst comprising a hydrated metal salt selected from the class consisting of hydrated ferric chloride, ferrous chloride, stannic chloride and copper sulphate and a condensing agent effective to produce a liquid resinous product, cured films of which are more craze-resistant than similar films of the original ethyl-phenyl silicone resin.

7. The method which comprises dissolving a liquid methyl-phenyl polysiloxane resin obtained by hydrolyzing a mixture of a methyl silicon halide, a phenyl silicon halide, and silicon tetrahalide in such proportions that the total number of methyl and phenyl groups in the product of hydrolysis does not exceed two per silicon atom in an aromatic hydrocarbon solvent in such proportions that the resultant solution has a resin base content of from 10 to 33 per cent by weight, and heating said solution to reflux temperatures in contact with about eight per cent by weight based on the weight of the resin of a mixture of a minor portion of hydrated ferric chloride and a major portion of antimony pentachloride.

8. The method which comprises dissolving a liquid intermediate methyl polysiloxane resin containing an average of at least one and not more than two methyl groups per silicon atom in toluene to form a solution containing from 10 to 33 per cent by weight of resin, and treating said resin with about 5 per cent antimony pentachloride and about 3 per cent of a hydrated iron chloride based on the weight of the resin by heating said solution in contact with said chlorides at refluxing temperatures, washing the resultant product with water until the pH of the final wash water is between 4 and 6, and recovering the resinous product.

9. The method of preparing a methyl polysiloxane resin, cured films of which can be heated at a temperature of 300° C. for at least 10 hours without crazing from a liquid intermediate polysiloxane resin obtained by hydrolyzing a mixture consisting essentially of about 12 to 25 mol per cent silicon tetrachloride, 8 to 28 mol per cent methyltrichlorosilane, and 52 to 80 mol per cent dimethyldichlorosilane, which comprises dissolving said intermediate resin in an aromatic hydrocarbon solvent to form a solution having a resin content of from 20 to about 33 per cent by weight, adding to said solution about 5 per cent antimony pentachloride, and 3 per cent hydrated ferric chloride based on the weight of the resin, heating the resultant composition for at least two hours at refluxing temperatures, washing the reaction product with water, and thereafter removing the antimony and iron salts.

10. The method which comprises forming a solution of a liquid methyl polysiloxane resin containing an average of at least one and not more than two methyl groups per silicon atom in a lower aromatic hydrocarbon solvent in proportions such that the resultant solution has a resin base content of from 10 to 33 per cent by weight, and refluxing said solution with a catalyst comprising hydrated ferric chloride.

11. A heat-hardenable resinous product obtained by hydrolyzing a mixture of about 20 mol per cent silicon tetrachloride, 55 mol per cent dimethyldichlorosilane, and 25 mol per cent methyltrichlorosilane, and refluxing a toluene solution of the resinous hydrolysis product having a resin base content of about 20 per cent with about 5 per cent antimony pentachloride and 3 per cent ferric chloride hexahydrate.

12. The method of treating a methyl polysiloxane resin containing an average of at least one and not more than two methyl groups per silicon atom while in the intermediate liquid stage of resinification to obtain products of improved craze-resistance which comprises dissolving the intermediate resin in an inert solvent selected from the class consisting of carbon tetrachloride and lower aromatic hydrocarbons to form a solution having a resin base content of from 10 to 33 per cent by weight and heating said solution at reflux temperatures in contact with a catalyst comprising a hydrated metal salt selected from the class consisting of hydrated ferric chloride, ferrous chloride, stannic chloride and copper sulphate.

13. The heat-hardenable resinous product of claim 12.

14. The method of treating a methyl polysiloxane resin which is the product of hydrolysis of a mixture of a dimethyldichlorosilane, methyltrichlorosilane and silicon tetrachloride in such proportions that there is an average of at least one and not more than two methyl groups per silicon atom in the hydrolysis product to obtain heat-hardenable products of improved craze-resistance which comprises dissolving the methyl polysiloxane resin while in an intermediate stage of resinification in an inert solvent selected from the class consisting of carbon tetrachloride and lower aromatic hydrocarbons to form a solution having a resin base content of from 10 to 33 per cent by weight and heating said solution at reflux temperatures in contact with a catalyst comprising a hydrated metal salt selected from the class consisting of hydrated ferric chloride, ferrous chloride, stannic chloride and copper sulphate.

15. The heat-hardenable resinous product of claim 14.

16. A heat-hardenable polysiloxane resin obtained by treating a hydrocarbon-substituted polysiloxane resin containing an average of at least one and not more than two hydrocarbon radicals per silicon atom in accordance with the process of claim 1, heat-hardenable films of said treated resin having the characteristic property of withstanding temperatures of the order of 300° C. without crazing for a substantially longer period of time than heat-hardened films of the untreated resin.

17. A heat-hardenable polysiloxane resin obtained by treating a methyl polysiloxane resin containing an average of at least one and not more than two methyl radicals per silicon atom in accordance with the process of claim 10, heat-hardened films of said treated resin having the characteristic property of withstanding temperatures of the order of 300° C. without crazing for a substantially longer period of time than heat-hardened films of the untreated resin.

18. A heat-hardenable polysiloxane resin obtained by treating a hydrocarbon-substituted polysiloxane resin containing an average of at least one and more than two hydrocarbon radicals per silicon atom in accordance with the process of claim 5, heat-hardened films of said treated resin having the characteristic property of withstanding a temperature of the order of 300° C. without crazing for a substantially longer period of time than the heat-hardened films of the untreated resin.

19. A heat-hardenable polysiloxane resin obtained by treating a methyl phenyl substituted polysiloxane resin containing an average of at least one and not more than two hydrocarbon radicals per silicon atom in accordance with the process of claim 7, heat-hardened films of said treated resin having the characteristic property of withstanding a temperature of the order of 300° C. without crazing for a substantially longer period of time than the heat-hardened films of the untreated resin.

JAMES G. E. WRIGHT.
JAMES MARSDEN.

CERTIFICATE OF CORRECTION.

Patent No. 2,389,477. November 20, 1945.

JAMES G. E. WRIGHT, ET AL.

It is hereby certified that error appears in the printed specification of the above numbered patent requiring correction as follows: Page 1, second column, line 3-4, for "polysilloxanes" read --polysiloxanes--; page 2, second column, line 18, for "tertachloride" read --tetrachloride--; line 38, for "dimethylchlorosilane" read --dimethyldichlorosilane--; line 39, for "methlychlorosilane" read --methyltrichlorosilane--; page 4, second column, line 34, claim 1, after "method" insert --of--; and that the said Letters Patent should be read with this correction therein that the same may conform to the record of the case in the Patent Office.

Signed and sealed this 12th day of March, A. D. 1946.

Leslie Frazer

(Seal) First Assistant Commissioner of Patents.

polysiloxane resin containing an average of at least one and not more than two hydrocarbon radicals per silicon atom in accordance with the process of claim 1, heat-hardenable films of said treated resin having the characteristic property of withstanding temperatures of the order of 300° C. without crazing for a substantially longer period of time than heat-hardened films of the untreated resin.

17. A heat-hardenable polysiloxane resin obtained by treating a methyl polysiloxane resin containing an average of at least one and not more than two methyl radicals per silicon atom in accordance with the process of claim 10, heat-hardened films of said treated resin having the characteristic property of withstanding temperatures of the order of 300° C. without crazing for a substantially longer period of time than heat-hardened films of the untreated resin.

18. A heat-hardenable polysiloxane resin obtained by treating a hydrocarbon-substituted polysiloxane resin containing an average of at least one and more than two hydrocarbon radicals per silicon atom in accordance with the process of claim 5, heat-hardened films of said treated resin having the characteristic property of withstanding a temperature of the order of 300° C. without crazing for a substantially longer period of time than the heat-hardened films of the untreated resin.

19. A heat-hardenable polysiloxane resin obtained by treating a methyl phenyl substituted polysiloxane resin containing an average of at least one and not more than two hydrocarbon radicals per silicon atom in accordance with the process of claim 7, heat-hardened films of said treated resin having the characteristic property of withstanding a temperature of the order of 300° C. without crazing for a substantially longer period of time than the heat-hardened films of the untreated resin.

JAMES G. E. WRIGHT.
JAMES MARSDEN.

CERTIFICATE OF CORRECTION.

Patent No. 2,389,477.   November 20, 1945.

JAMES G. E. WRIGHT, ET AL.

It is hereby certified that error appears in the printed specification of the above numbered patent requiring correction as follows: Page 1, second column, line 3-4, for "polysilloxanes" read --polysiloxanes--; page 2, second column, line 18, for "tertachloride" read --tetrachloride--; line 38, for "dimethylchlorosilane" read --dimethyldichlorosilane--; line 39, for "methlychlorosilane" read --methyltrichlorosilane--; page 4, second column, line 34, claim 1, after "method" insert --of--; and that the said Letters Patent should be read with this correction therein that the same may conform to the record of the case in the Patent Office.

Signed and sealed this 12th day of March, A. D. 1946.

Leslie Frazer (Seal)   First Assistant Commissioner of Patents.